United States Patent
Park et al.

(10) Patent No.: US 8,611,396 B2
(45) Date of Patent: Dec. 17, 2013

(54) FREQUENCY HOPPING MODULATION APPARATUS AND METHOD IN COMMUNICATION SYSTEM

(75) Inventors: Sung-Kweon Park, Seongnam-si (KR); Byung-Jik Kim, Seongnam-si (KR); Jeong-Rok Park, Hwaseong-si (KR); Jin-Serk Baik, Ansan-si (KR)

(73) Assignee: Samsung Electronics Co., Ltd (KR)

( * ) Notice: Subject to any disclaimer, the term of this patent is extended or adjusted under 35 U.S.C. 154(b) by 445 days.

(21) Appl. No.: 12/795,298

(22) Filed: Jun. 7, 2010

(65) Prior Publication Data

US 2010/0309953 A1 Dec. 9, 2010

(30) Foreign Application Priority Data

Jun. 5, 2009 (KR) .................. 10-2009-0049814

(51) Int. Cl.
*H04B 1/00* (2006.01)
(52) U.S. Cl.
USPC .......................................... 375/135; 375/139
(58) Field of Classification Search
USPC .................. 375/130, 132, 133, 135, 139
See application file for complete search history.

(56) References Cited

U.S. PATENT DOCUMENTS

| | | | | |
|---|---|---|---|---|
| 4,891,778 A | * | 1/1990 | Baseghi et al. | 708/276 |
| 5,008,845 A | * | 4/1991 | Adcock | 340/384.7 |
| 5,019,825 A | * | 5/1991 | McCorkle | 342/201 |
| 5,926,125 A | * | 7/1999 | Wood | 342/25 F |
| 2003/0133496 A1 | * | 7/2003 | Hooton | 375/139 |
| 2009/0290658 A1 | * | 11/2009 | Moore et al. | 375/295 |

OTHER PUBLICATIONS

Albert J. Berni et al., "On the Utility of Chirp Modulation for Digital Signaling", IEEE Transactions on Communications, Jun. 1973.

* cited by examiner

*Primary Examiner* — Jean B Corrielus
(74) *Attorney, Agent, or Firm* — The Farrell Law Firm, P.C.

(57) ABSTRACT

Disclosed is a frequency hopping modulation method in a communication system. The method includes: generating a frequency hopping pattern according to a hopping frequency's level; generating a hopping frequency through use of the frequency hopping pattern; modulating an original signal to a frequency hopping spread signal by multiplying the original signal by the hopping frequency; generating a chirp pulse code for diversifying the frequency hopping spread signal; and modulating the frequency hopping spread signal to a chirp pulse signal by multiplying the frequency hopping spread signal by the chirp pulse code.

13 Claims, 5 Drawing Sheets

FREQUENCY HOPPING MODULATION APPARATUS AND METHOD IN COMMUNICATION SYSTEM

PRIORITY

This application claims priority to an application entitled "Frequency Hopping Modulation Apparatus and Method in Communication System" filed in the Korean Intellectual Property Office on Jun. 5, 2009 and assigned Serial No. 10-2009-0049814, the contents of which are incorporated herein by reference.

BACKGROUND OF THE INVENTION

1. Field of the Invention

The present invention relates to a frequency hopping modulation in a communication system, and more particularly to a method for coding a frequency hopping spread signal by modulating the frequency hopping spread signal to a chirp pulse in a wireless communication system in which a Frequency Hopping Spread Spectrum (FHSS) scheme is used.

2. Description of the Related Art

In general, a spread spectrum technology refers to a technology of transmitting specific information through the use of a much wider bandwidth than a theoretical bandwidth required for transmitting the specific information. For example, when it is assumed that there is an information source to be transmitted at a data transfer rate of 5 kbps, usually, the information source can be transmitted with a bandwidth of 5 kHz. However, when a much wider frequency bandwidth, e.g. 1 MHz, is used to transmit the information source, an error rate or signal-to-noise (S/N) ratio is enhanced although the use efficiency of the frequency band is degraded. Also, when a much wider frequency bandwidth than necessary is used, although the intensity of a spread and transmitted signal is very weak, it is possible to achieve communication, and although lots of transmitters transmit specific signals to a specific receiver at the same time, the specific signals can be delivered to the specific receiver having a specific code because the much wider frequency bandwidth provides a robust environment to minimize noise signals. That is, since one channel can be used by a plurality of users at the same time, the capacity increases proportionately.

Such a spread spectrum technology includes a direct sequence scheme, a frequency hopping scheme, a time hopping scheme, a chirp spread spectrum scheme, etc. In particular, the frequency hopping scheme is a spread spectrum scheme in which a transmission frequency is not fixed and varies according to time in a wireless communication system. That is, the frequency hopping scheme is a scheme in which a transmitting side and a receiving side communicate with each other while varying frequencies. A representative technology, to which the frequency hopping scheme is applied, is a Bluetooth technology, which is a wireless personal area network (WPAN) technology. The Bluetooth technology uses an Industrial Scientific Medical (ISM) band of 2.4 GHz, and reduces interference with other wireless communication technologies. In addition, the Bluetooth technology uses an adaptive frequency hopping scheme from version 1.5 of the Bluetooth software so as to adaptively select a channel having a low interference level at 2.4 GHz band, thereby avoids more interference.

FIG. 1 is a block diagram illustrating the configuration of a conventional frequency hopping system.

The frequency hopping system includes a frequency synthesizer 101, a frequency table 103, and a pseudo noise (PN) code generator 105. The PN code generator 105 generates PN codes relating to frequency hopping patterns, and stores the generated PN codes in the frequency table 103. The number of frequency hopping patterns stored in the frequency table 103 may vary depending on wireless communication schemes. The frequency synthesizer 101 generates a hopping frequency through the use of a frequency hopping pattern stored in the frequency table 103. Different frequency hopping spread signals may be generated depending on frequency hopping patterns stored in the frequency table 103, and a frequency hopping pattern to be used is predetermined upon a first communication channel being established. The hopping frequency generated in such a scheme is multiplied by the original signal so that a frequency hopping spread signal is produced.

FIG. 2 is a graph illustrating a frequency hopping spread signal generated by the conventional frequency hopping scheme. According to the frequency hopping spread scheme, data is transmitted using a frequency, which is not fixed and varies over time. Accordingly, since the value of the frequency varies depending on time, the number of the patterns is diversified, which means that many users can access the wireless communication at the same time.

According to such a frequency hopping scheme, when a receiving side receives data transmitted from a transmitting side, the receiving side demodulates data, which has been modulated in a predetermined hopping pattern, wherein the number of hopping patterns equates to the number of users who can simultaneously have access without interference. As the number of hopping patterns increases, more users can perform short-range wireless communication without risk of collision with other users in the same space. However, the frequency hopping scheme used in a common use frequency band, such as the ISM band, is still limited in the number of frequency hopping patterns, so that a considerable reduction of interference between users has not been achieved until the present invention. Therefore, it is necessary to develop a method which enables wireless communication to be provided to more users at the same time than the conventional frequency hopping spread spectrum scheme while reducing interference with other users, i.e. interference with other wireless communication signals.

SUMMARY OF THE INVENTION

Accordingly, the present invention has been made to solve the above-mentioned problems occurring in the prior art, and the present invention provides an apparatus and method for enhancing communication performance by increasing the number of channels, which can be used at the same time by users using wireless communication devices, by means of a frequency hopping spread signal modulated to a chirp pulse, and by reducing interference with other wireless communication signals.

In accordance with an aspect of the present invention, there is provided a frequency hopping modulation method in a communication system, the method including: generating a frequency hopping pattern according to a hopping frequency's level; generating a hopping frequency through use of the frequency hopping pattern; modulating an original signal to a frequency hopping spread signal by multiplying the original signal by the hopping frequency; generating a chirp pulse code for diversifying the frequency hopping spread signal; and modulating the frequency hopping spread signal to a chirp pulse signal by multiplying the frequency hopping spread signal by the chirp pulse code.

In accordance with another aspect of the present invention, there is provided a frequency hopping modulation apparatus in a communication system, the apparatus including a frequency table for storing a frequency hopping pattern; a frequency synthesizer for generating a frequency hopping spread signal through use of the frequency hopping pattern stored in the frequency table; a chirp table for storing a chirp pulse code to diversify the frequency hopping spread signal; and a chirp generator for generating a chirp pulse signal through use of the chirp pulse code stored in the chirp table.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE INVENTION

Hereinafter, embodiments of the present invention will be described with reference to the accompanying drawings. In the following description, many particular items such as a detailed component device are shown, but these are given only for providing the general understanding of the present invention. It will be understood by those skilled in the art that various changes in form and detail may be made within the scope of the present invention.

Figure 1:
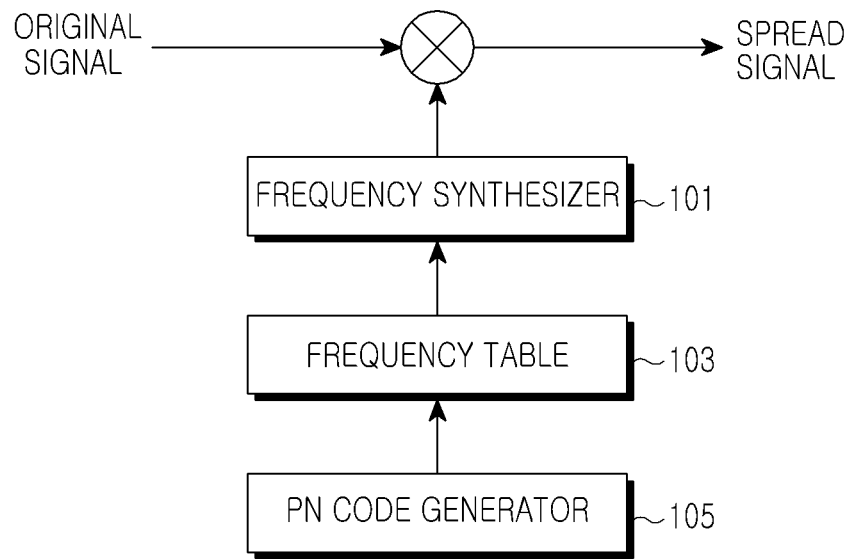
FIG. 1 is a block diagram illustrating the configuration of a conventional frequency hopping system.
Figure 2:
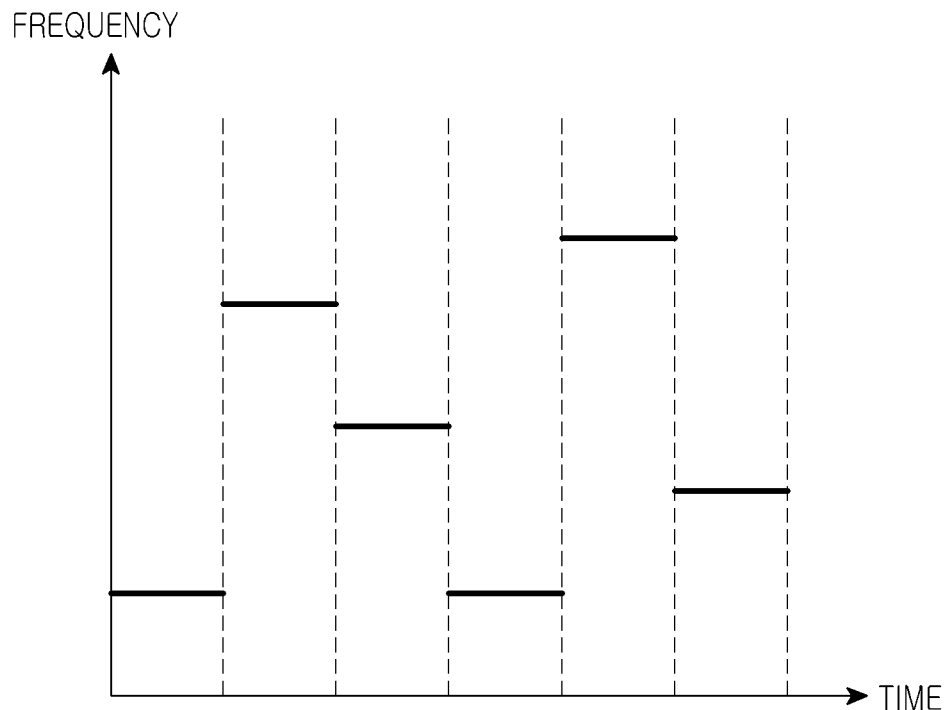
FIG. 2 is a graph illustrating a frequency hopping spread signal generated by the conventional frequency hopping scheme.
Figure 3:
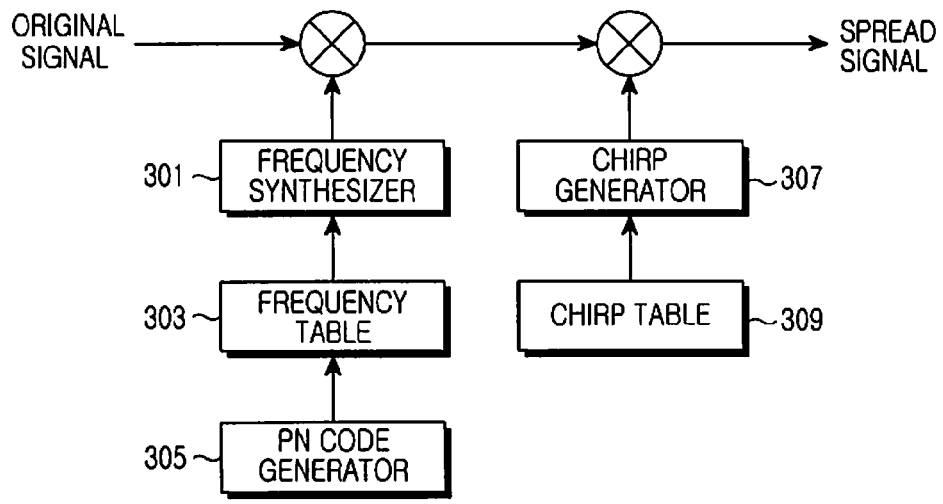
FIG. 3 is a block diagram illustrating the configuration of a frequency hopping system for coding to a chirp pulse according to an embodiment of the present invention.

FIG. 3 is a block diagram illustrating the configuration of a frequency hopping system for coding to a chirp pulse according to an embodiment of the present invention.

The frequency hopping system for coding to a chirp pulse includes a frequency synthesizer 301, a frequency table 303, a pseudo noise (PN) code generator 305, a chirp generator 307, and a chirp table 309.

The PN code generator 305 generates PN codes relating to frequency hopping patterns, and stores the generated PN codes in the frequency table 303. The number of frequency hopping patterns stored in the frequency table 303 may vary depending on wireless communication schemes. The frequency synthesizer 301 generates a hopping frequency by applying a frequency hopping through the use of one of frequency hopping patterns stored in the frequency table 303.

The hopping frequency generated in such a scheme is multiplied by the original signal so that a frequency hopping spread signal is produced.

The chirp table 309 stores chirp pulse codes, and the chirp generator 307 generates and stores chirp pulse codes in the chirp table 309. Here, various chirp pulse codes may be generated depending on patterns, such as an up chirp or a down chirp. Thereafter, the generated frequency hopping spread signal is multiplied by a corresponding chirp pulse code among various chirp pulse codes stored in the chirp table 309, and is modulated to a chirp pulse signal. In this case, according to the corresponding chirp pulse code, the frequency hopping spread signal is coded to an up chirp signal or a down chirp signal. One chirp pulse code is multiplied at each hop, wherein, with respect to successive hops, the same chirp pulse code may be repeatedly multiplied, or different chirp pulse codes may be multiplied depending on the respective hops. The coded frequency hopping spread signal is applied to a corresponding communication system.

With respect to hopping patterns and chirp pulse codes stored in the frequency table 303 and the chirp table 309, respectively, it is predetermined upon establishment of a first communication channel which frequency hopping pattern and which chirp code are stored in the respective tables and are to be used.

Figure 4:
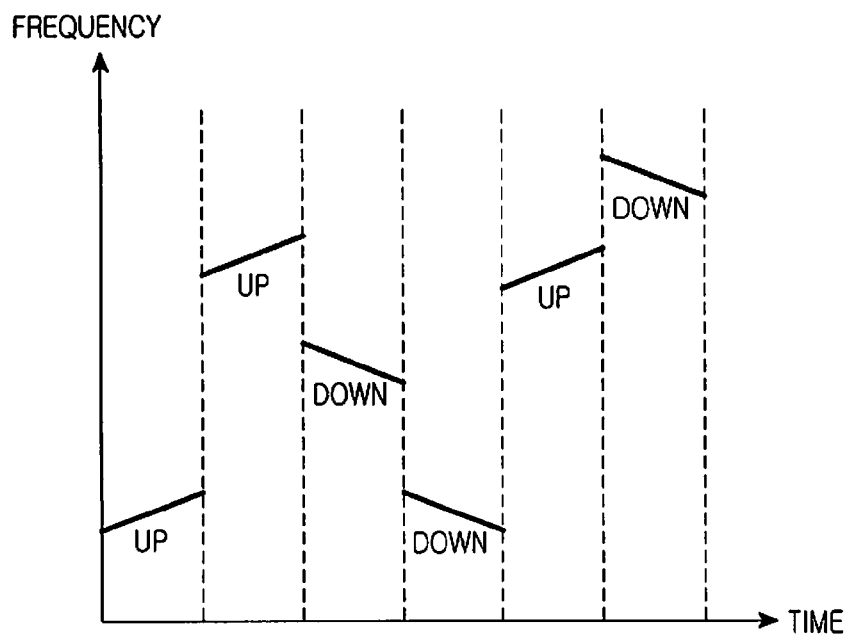
FIG. 4 is a graph illustrating a frequency hopping spread signal coded to a chirp pulse according to an embodiment of the present invention.

FIG. 4 is a graph illustrating a frequency hopping spread signal coded to a chirp pulse according to an embodiment of the present invention.

The frequency hopping spread spectrum scheme for coding a signal to a chirp pulse, proposed by the present invention, is implemented in such a manner as to increase or decrease the respective frequency components in a predetermined period of time, wherein each frequency component may be configured in the form of an up chirp or a down chirp. When this is generalized, with respect to one hopping pattern, a combination of frequency components having multiple up chirps and down chirps can be used for coding. That is, one hopping pattern includes a plurality of codes. FIG. 4 shows six frequency components, wherein an up chirp or a down chirp is applied according to each frequency component. In detail, FIG. 4 shows a case where chirps are applied in the order of up, up, down, down, up, and down. As described above, the frequency components do not have an equal frequency, but have decreased or increased frequencies in various patterns, so that it is possible to reduce interference with other communication technologies. In the following description, graphs showing combinations of frequency components, to which chirps of various patterns are applied, will be compared and explained.

FIGS. 5A to 5D are graphs illustrating signals obtained by diversely coding a specific frequency hopping pattern to chirp pulses according to an embodiment of the present invention.

Figure 5A:
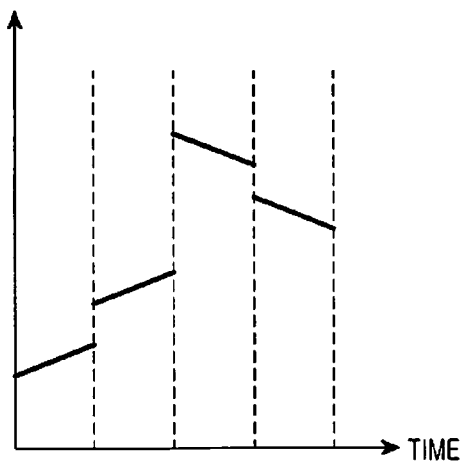
FIGS. 5A to 5D are graphs illustrating signals obtained by diversely coding a specific frequency hopping pattern to chirp pulses according to an embodiment of the present invention.
Figure 5B:
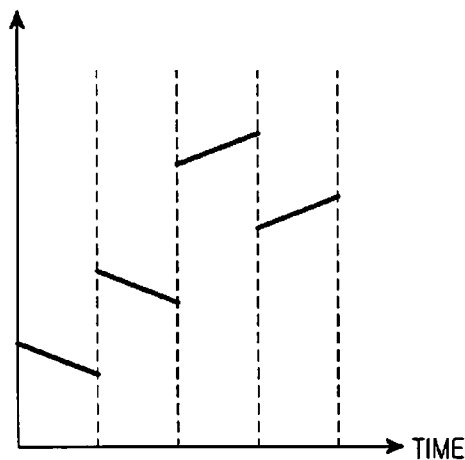
Figure 5C:
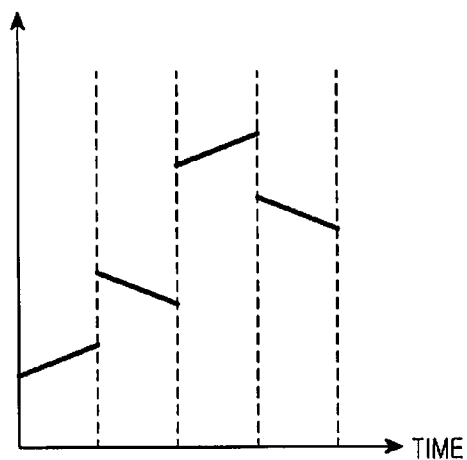
Figure 5D:
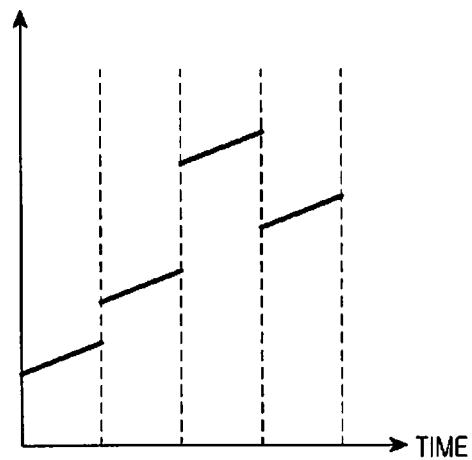

As shown in FIGS. 5A to 5D, even with respect to the same frequency hopping pattern, when different chirp codes are applied, increasing/decreasing patterns of frequencies are different depending on each time, so that various codes are generated. For example, although the same frequency hopping pattern is used, FIG. 5A shows a case where the frequency increasing/decreasing pattern according to each time is expressed in the form of up, up, down, and down, and FIG. 5B shows a case where the frequency increasing/decreasing pattern is expressed in the form of down, down, up, and up. Also, FIG. 5C shows a case where the pattern is expressed in the form of up, down, up, and down, and FIG. 5D shows a case where the pattern is expressed in the form of up, up, up, and up. Thereby, it can be understood that the same frequency hopping pattern is expressed in multiple different manners.

Thus, although the same frequency hopping pattern is applied, various frequency hopping spread spectrum schemes can be generated due to application of various chirp codes. Therefore, when a coding operation using a combination of chirp codes is performed with respect to each frequency hopping, as described above, the number of frequency hopping spread spectrum schemes allowing simultaneous access is considerably increased as compared with that of conventional technology.

For example, according to the frequency hopping technology of the Bluetooth system based on IEEE 802.15.1, up to 1600 hops per second occur, and hopping frequencies of 79 steps are included. That is, since up to 79 channels may be used, 79 users can access the wireless communication technology based on IEEE 802.15.1 at the same time. In this case, when the coding with a combination of up and down chirps is performed with respect to each frequency hop, as proposed in the present invention, the number of users of frequency hopping spread spectrum schemes allowed simultaneous access is considerably increased as compared with that allowed in the conventional technology.

Meanwhile, one chirp pulse code may be configured with only one chirp, or may be configured with one or more sub-chirps, which will be described in detail as an embodiment in the below description.

Figure 6A:
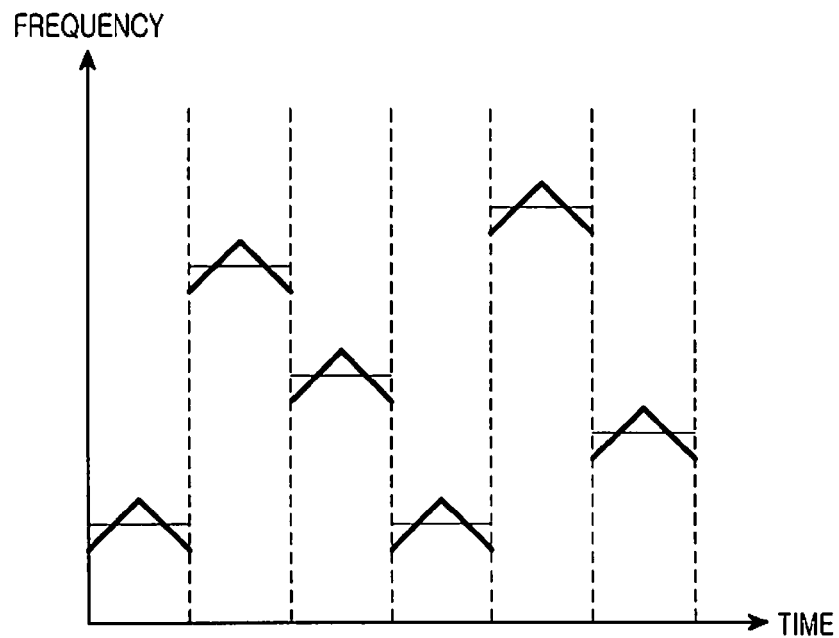
FIGS. 6A and 6B are graphs illustrating signals, to which chirp pulse codes configured with one or more chirps are applied, according to an embodiment of the present invention.
Figure 6B:
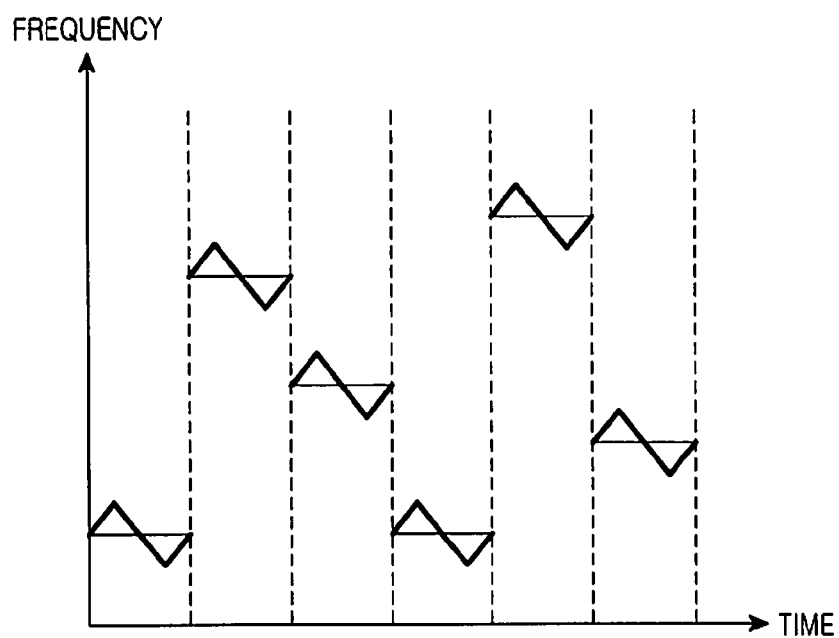

FIGS. 6A and 6B are graphs illustrating signals, to which chirp pulse codes configured with one or more chirps are applied, according to an embodiment of the present invention. While FIG. 4 described above shows the case where a chirp pulse code configured with one chirp is multiplied according to each specified time, FIGS. 6A to 6D will be explained on a system in which a chirp pulse code, where one chirp is constituted with four sub-chirps within the same specified time, is multiplied, as an example.

FIG. 6A shows a case where a chirp pulse code configured with four sub-chirps is multiplied according to each specified time, as described above. Referring to the configuration of the sub-chirps constituting a chirp pulse code, it can be understood that the four sub-chirps are configured with up, up, down, and down chirps, respectively.

FIG. 6B shows the case where a chirp pulse code configured with four sub-chirps is multiplied according to each specified time, wherein it can be understood that four sub-chirps are configured with up, down, down, and up chirps, respectively.

As described above, by using a chirp pulse code configured using one or more chirps, it is possible to generate other frequency hopping patterns with respect to one frequency hopping pattern.

Figure 7:
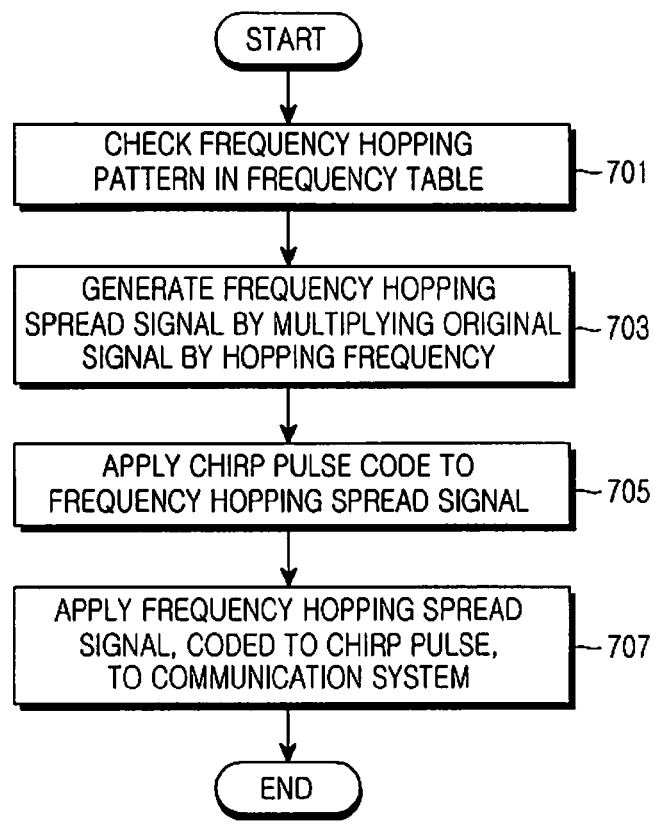
FIG. 7 is a flowchart illustrating a process for modulating a frequency, which is shifted according to a hopping pattern, to a chirp pulse, and coding the frequency to a chirp signal according to an embodiment of the present invention.

FIG. 7 is a flowchart illustrating a method for modulating a frequency, which is shifted according to a hopping pattern, to a chirp pulse, and coding the frequency to a chirp signal according to an embodiment of the present invention.

First, in step 701, the frequency synthesizer checks a corresponding frequency hopping pattern in a frequency table. The frequency table may store one or more frequency hopping patterns according to wireless communication schemes. The frequency synthesizer generates a hopping frequency by using the checked corresponding frequency hopping pattern. In step 703, the generated hopping frequency is multiplied by the original signal, thereby converting it into a frequency hopping spread signal.

In step 705, the generated frequency hopping spread signal is multiplied by a chirp pulse code, thereby being modulated to a chirp pulse signal. Here, the chirp pulse code may be one of multiple chirp pulse codes stored in the chirp table, and the chirp generator selects a corresponding chirp pulse code and multiplies the frequency hopping spread signal by the selected chirp pulse code, thereby modulating the frequency hopping spread signal to a chirp pulse signal. The chirp pulse signal obtained through such modulation is configured with a combination of chirp pulses, of which the frequencies increase or decrease during a specified period of time, wherein each chirp pulse may be configured with an up chirp or down chirp. Further, each chirp pulse may be configured with a plurality of sub-chirps so that the number of frequency hopping patterns can be further increased. In step 707, the chirp pulse signal, i.e., the frequency hopping spread signal coded to a chirp pulse is applied to a communication system.

As described above, according to the present invention, it is possible to solve the problem which is caused when the conventional frequency hopping spread spectrum scheme maintains a frequency value at the same level during a predetermined period of time according to each frequency, so that the number of hopping patterns is further increased, and the number of users who can have simultaneous access is also increased.

The configuration and operation of the frequency hopping modulation apparatus and method in a communication system according to an embodiment of the present invention can be achieved as described above. While the invention has been shown and described with reference to certain embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and equivalents thereof.

According to the present invention, a frequency hopping spread signal shifted according to a hopping pattern is modulated to a chirp pulse, and is coded to an up or down chirp signal, so that interference with other wireless communication signals is reduced to enhance the communication performance, and the number of channels which can be simultaneously used by users using wireless communication devices are further increased.

While the present invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A frequency hopping modulation method in a communication system, the method comprising:
   generating one or more frequency hopping patterns according to a level of hopping frequency;
   generating a hopping frequency through use of the one or more frequency hopping patterns;
   modulating an original signal to a frequency hopping spread signal by multiplying the original signal by the hopping frequency;
   generating a chirp pulse code for diversifying the frequency hopping spread signal; and
   modulating the frequency hopping spread signal to a chirp pulse signal by multiplying the frequency hopping spread signal by the chirp pulse code.

2. The method of claim 1, wherein the one or more of the generated frequency hopping patterns are generated according to wireless communication schemes.

3. The method of claim 2, wherein the hopping frequency is generated according to a hopping frequency of one frequency hopping pattern which is selected from among the one or more frequency hopping patterns.

4. The method of claim 1, wherein the chirp pulse code comprises one or more sub-chirps.

5. The method of claim 1, wherein the chirp pulse code is multiplied by one hopping pattern or by various hopping patterns.

6. The method of claim 1, wherein the one or more frequency hopping patterns and the chirp pulse code are predetermined upon a first communication channel establishment.

7. A frequency hopping modulation apparatus in a communication system, the apparatus comprising:
- a PN code generator for generating one or more frequency hopping patterns according to a level of hopping frequency;
- a frequency synthesizer for generating a hopping frequency through use of the one or more frequency hopping patterns;
- a first multiplier for modulating an original signal to a frequency hopping spread signal by multiplying the original signal by the hopping frequency;
- a chirp generator for generating one or more chirp pulse codes for diversifying the frequency hopping spread signal; and
- a second multiplier for modulating the frequency hopping spread signal to a chirp pulse signal by multiplying the frequency hopping spread signal by one of the one or more chirp pulse codes.

8. The apparatus of claim 7, wherein the one or more frequency hopping patterns are variously generated according to wireless communication schemes.

9. The apparatus of claim 7, wherein the frequency synthesizer selects one from among the one or more frequency hopping patterns.

10. The apparatus of claim 7, wherein the chirp generator selects one from among the one or more chirp pulse codes, and wherein the selected chirp pulse code is multiplied by the frequency hopping spread signal, thereby generating the chirp pulse signal.

11. The apparatus of claim 7, wherein the chirp pulse code comprises one or more sub-chirps.

12. The apparatus of claim 7, further comprising:
a frequency table for storing the one or more frequency hopping patterns.

13. The apparatus of claim 7, further comprising:
a chirp table for storing the one or more chirp pulse codes.

* * * * *